United States Patent [19]

Brodie

[11] 3,899,603

[45] Aug. 12, 1975

[54] FRANKFURTER/HAMBURGER BUN

[76] Inventor: Merritt H. Brodie, 26 Laura Dr., Westbury, N.Y. 11590

[22] Filed: Oct. 12, 1973

[21] Appl. No.: 405,922

[52] U.S. Cl.................. 426/138; 426/496; D1/2
[51] Int. Cl............................................. A21d 13/00
[58] Field of Search ........... 426/138, 514, 104, 105, 426/144, 496, 502, 152, 283, 391, 2, 24

[56] References Cited
UNITED STATES PATENTS

| | | | |
|---|---|---|---|
| 1,726,946 | 9/1929 | Burdick | 426/138 |
| 1,910,620 | 5/1933 | Mabey | 426/391 |
| 2,601,822 | 7/1952 | Hopkins | 99/339 |

*Primary Examiner*—Raymond N. Jones
*Attorney, Agent, or Firm*—Hubbell, Cohen, & Stiefel

[57] ABSTRACT

A frankfurter/hamburger bun having an uncrusted surface and a crusted surface. The bun is elongated with a transverse fold line in its crusted surface. A longitudinal fold line is also provided in the crusted surface. If the bun is folded about its transverse fold line, it is suitable for hamburgers; if folded longitudinally, it is suitable for frankfurters. A method of making the bun is also disclosed wherein two such buns are baked as one and then sliced along the median plane parallel to the two exposed crusted surfaces whereby to form two uncrusted surfaces.

7 Claims, 5 Drawing Figures

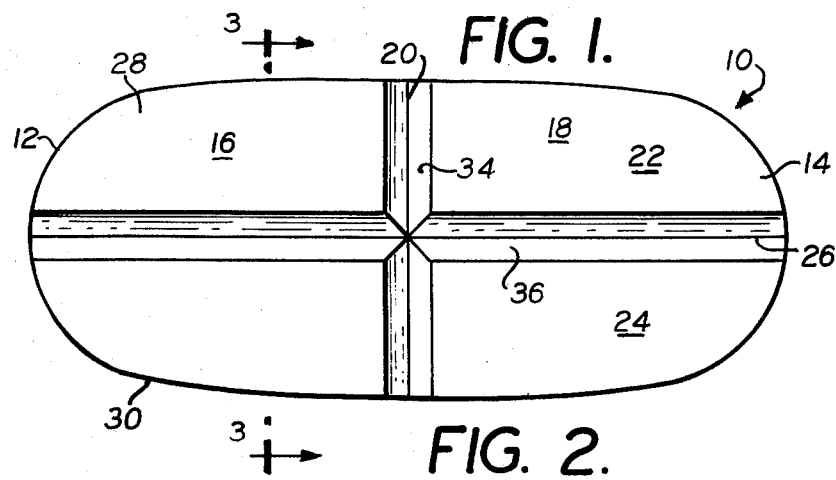
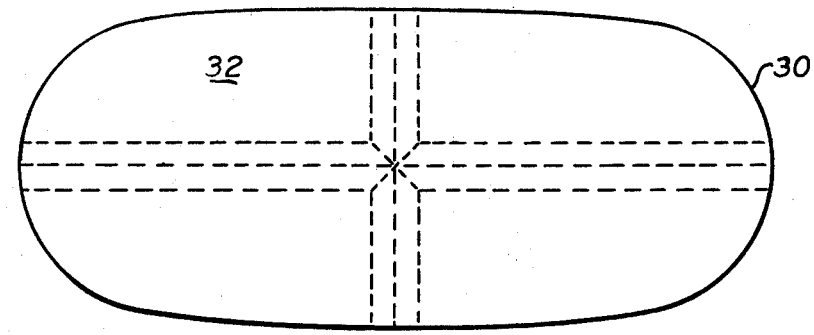
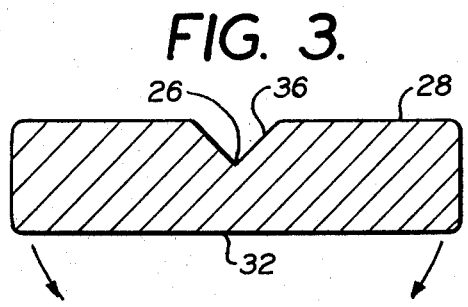
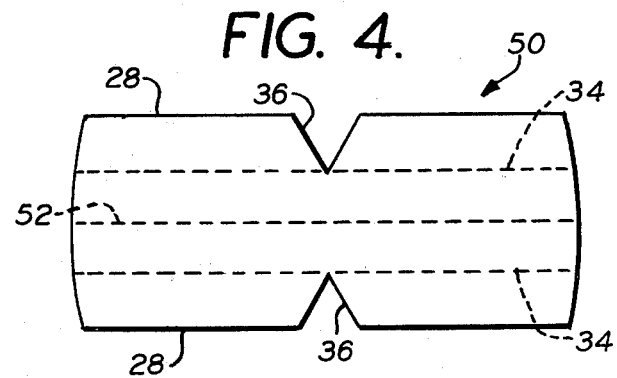
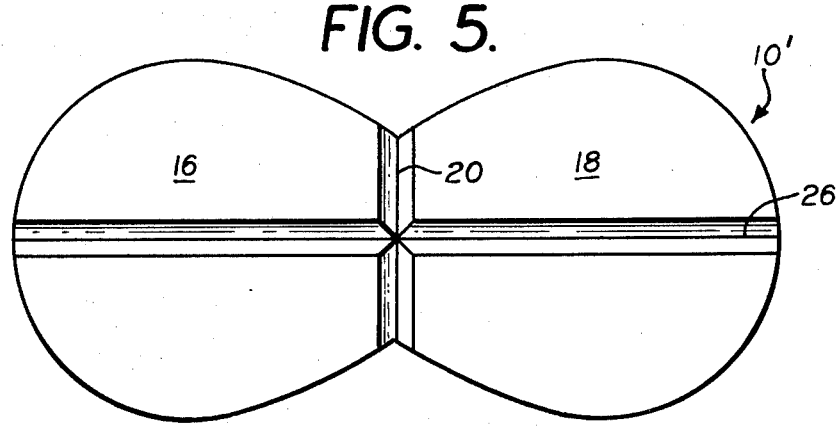

FRANKFURTER/HAMBURGER BUN

BACKGROUND OF THE INVENTION

1. Field of the Invention

This invention relates to baked goods and particularly to soft rolls or buns. Most particularly, this invention relates to frankfurter/hamburger buns.

2. Prior Art

Round soft-crusted hamburger buns are well known. Generally, these are sold with a slice through the median plane thereof whereby to facilitate the opening of the bun by the user for the positioning of a hamburger therein. Elongated soft-crusted frankfurter rolls or buns are also well known. These buns are oblong in shape with a slice through a longitudinally extending plane therein whereby to facilitate the bending open of the roll for the reception of a frankfurter. Bakeries and retail outlets are required to stock both kinds of buns whereby to maintain a relatively large inventory whose consumption is difficult to project.

SUMMARY OF THE INVENTION

A relatively flat roll having a somewhat elongated oval shape and further having one surface with a soft crust and the opposite surface uncrusted is provided. On the crusted surface, there is a transversely extending groove or indentation defining a fold line along the transverse axis of the roll. Also provided in the crusted surface is a longitudinally extending groove defining a second fold line along the longitudinal axis thereof. Such a roll can be employed as a hamburger roll by folding it along the transverse axis, whereby to form a bun approaching the shape of a conventional hamburger bun. The same bun may be employed as a frankfurter roll by folding it along the longitudinal fold line, whereby to define a bun substantially identically shaped to that of a conventional frankfurter roll. If it is desired that the bun more nearly approach the shape of a hamburger bun, then the bun maybe necked down in the vicinity of the transverse fold line to shape the halves on opposite sides of the transverse fold line nearly circular, so as to more closely conform to the shape of a conventional hamburger bun when folded along the transverse fold line. Such a modified bun would still serve satisfactorily as a frankfurter roll.

A method of baking the buns as above described is also disclosed wherein a preform is made which is approximately twice as thick as the desired final product. Transverse and longitudinal grooves are provided in both the upper and lower surfaces of the preform and the preform is then baked until the roll is baked with a soft crust on the outside, that is, on all exposed surfaces of the preform. After the baking step is completed, the preform is sliced along its median plane, whereby to form two rolls of the present invention.

BRIEF DESCRIPTION OF THE DRAWING

In the drawing:

FIG. 1 is a bottom plane view of a frankfurter/hamburger bun in accordance with the present invention;

FIG. 2 is a top plane view thereof;

FIG. 3 is a sectional view taken along the line 3—3 of FIG. 2;

FIG. 4 is an end view of a preform showing an intermediate step in a method for making a frankfurter/hamburger bun of the present invention; and FIG. 5 is a view similar to FIG. 1 showing a modified bun of the present invention.

DETAILED DESCRIPTION OF THE PREFERRED EMBODIMENTS

Referring now to the drawing in detail, a bun or roll (the words herein being used interchangeably) embodying the present invention is illustrated in the drawing. The roll is formed from a body of soft roll type bread designated generally by the reference character 10. Such a roll is shown in plan view to be elongated with rounded ends 12 and 14. The roll 10 is formed of two symmetrical halves 16 and 18 about a central transverse fold line 20 and is formed of two symmetrical halves 22 and 24 about a central longitudinal fold line 26. Preferably the relatively flat surface 28 in which the fold lines 20 and 27 are found has a soft crust on it as does the peripheral edge 30. The surface opposite the crusted surface 28, that is, the surface 32, is preferably without a crust.

As may best be seen in FIGS. 1 and 3, the transverse and longitudinal fold lines 20 and 26 are formed by the provision in the crusted surface 28 of V-shaped grooves 34 and 36, respectively, although other means for providing such fold lines 20 and 26 may be employed. Thus, for example, instead of using V-shaped grooves, slits may be provided in such surface or rounded grooves or the like may be employed. It is also within the scope of the invention to define the fold lines by grooves or slits in the uncrusted surface 32 rather than in the crusted surface 28, although the formation of such a bun is somewhat less than convenient than the one being described herein.

In use, if it is desired to employ the bun as a hamburger bun, it is folded about the transverse fold line 20 to bring the two halves of the uncrusted surface 32 into close confronting relation with one another. The bun is now in position to receive an ordinary hamburger which is commonly circular in peripheral configuration, whereby to conform substantially to the shape of the folded bun. If in the alternative, it is decided to employ the bun as a frankfurter roll, than the bun is folded along its longitudinal fold line 26 to bring the two longitudinally extending halves of the uncrusted surface 32 into close confronting relation and in such folded condition, the bun is ready to receive a normally elongated frankfurter whose shape the bun now conforms to very closely. Thus, the same bun may be employed for both frankfurters and hamburgers whereby to greatly simplify the purchasing for the consumer who may be serving both frankfurters and hamburgers. Such buns further greatly simplify the inventory practice for retail baked goods outlets which are now required to carry certain amounts of conventional frankfurters and hamburger rolls. With this invention, they need carry only one roll, whereby to give their inventory far greater flexibility. A similar advantage is yielded to the bakeries for such baked goods, whereby to increase the efficiency of their operations.

If it is desired that the bun when used for a hamburger more closely conform to the round peripheral shape of a hamburger, then the periphery of the bun may be shaped somewhat like a figure 8 as shown in FIG. 5, wherein the transverse extent of the bun in the vicinity of the transverse fold line 20 is necked or narrowed down to give each of the halves 16 and 18 of the bun 10' a rounded peripheral configuration when the bun is folded along the transverse fold line 20. This yields an appearance closer to that of a conventional hamburger bun. Naturally, when the bun 10' of FIG. 5 is folded along its longitudinal fold line 26, it will be a little less like a conventional frankfurter roll than would the bun 10 of FIG. 1. However, it will still serve well as a frankfurter roll with such configuration.

A preferred method of making the bun of the present invention is to first mix dough for soft crusted rolls of this type which recipe or recipes are well known to those skilled in the art in making soft rolls. The dough is then formed into a preform 50 having substantially the peripheral configuration of either the bun 10 or the bun 10' and a thickness which, after baking, will be twice that of a roll 10 or 10'. As shown in FIG. 4, transverse and longitudinal V-shaped grooves 34 and 36 (or other form of grooves) are provided in both the upper and lower substantially planar surfaces 28 in the preform 50. After being so shaped, the preform is placed in an oven at a suitable elevated temperature for baking, which temperature is well known to those skilled in the art, and the preform is baked until done, the time for such baking step being well known to bakers. Thereafter, the preform is removed from the oven and it is sliced along the median plane 52 substantially equidistant between the two surfaces 28. By slicing the preform 50 along the plane 52, two buns 10 or 10' are formed out of one preform. Naturally, other methods may be employed for making the buns 10 and 10', but the method above described is presently preferred.

While I have herein shown and described the preferred form of the present invention and have suggested modifications therein, other changes and modifications may be made therein within the scope of the appended claims without departing from the spirit and scope of this invention.

What is claimed is:

1. A frankfurter or hamburger bun comprising a bread body having a pair of relatively flat opposed surfaces, one of said surfaces having a soft crust thereon, the other of said surfaces being substantially crust free, said bread body being elongated, a transversely extending centrally located groove in said bread body for permitting the folding of said bread body along said groove to bring the two sides of said uncrusted surface on opposite sides of said transverse groove into confronting relation, whereby to form a hamburger bun, and a longitudinally extending centrally located groove in said bread body for permitting the folding of said bread body along said longitudinal groove to bring the two sides of said uncrusted surface on opposite sides of said longitudinal groove into confronting relation, whereby to form a frankfurter bun.

2. The frankfurter or hamburger bun of claim 1, wherein said means for permitting said folding along said transverse grooves are provided in the surface of said bread body having the crust thereon.

3. The frankfurter or hamburger bun of claim 1, wherein said bread body is substantially symmetrical about both said transverse and longitudinal grooves, and the ends of said bread body are arcuate.

4. The frankfurter or hamburger bun of claim 3, wherein said grooves are V-shaped grooves.

5. The frankfurter or hamburger bun of claim 4, wherein said grooves are in the surface having a crust.

6. The frankfurter or hamburger bun of claim 3, wherein said bread body is narrower adjacent the transverse line than it is outwardly therefrom.

7. A method of making a combination frankfurter/hamburger bun, comprising:
   forming a dough for producing a soft roll;
   shaping at least a portion of said dough into an elongated preform having a pair of spaced apart substantially parallel substantially planar surfaces with a centrally located transverse groove and a centrally located longitudinal groove in each of said pair of surfaces;
   heating said preform to bake the dough therein and to form a soft crust on the outer surface thereof; and
   cutting said preform along a plane substantially parallel to and between said pair of spaced apart surfaces, whereby to form two frankfurter or hamburger buns.

* * * * *